United States Patent [19]

Park

[11] Patent Number: 5,652,836
[45] Date of Patent: Jul. 29, 1997

[54] CPU RESET CIRCUIT

[75] Inventor: Seong-Kue Park, Gumi, Rep. of Korea

[73] Assignee: SamSung Electronics Co., Ltd., Suwon, Rep. of Korea

[21] Appl. No.: 651,576

[22] Filed: May 22, 1996

[30] Foreign Application Priority Data

May 31, 1995 [KR] Rep. of Korea .................. 14069/1995

[51] Int. Cl.$^6$ .............................. G01R 31/28; G06F 11/00
[52] U.S. Cl. .................................... 395/185.08; 371/62
[58] Field of Search ......................... 395/185.08, 185.01; 371/62, 61

[56] References Cited

U.S. PATENT DOCUMENTS

| | | | |
|---|---|---|---|
| 4,541,050 | 9/1985 | Honda | 395/185.08 X |
| 4,696,002 | 9/1987 | Schleupen et al. | 395/182.21 |
| 4,803,682 | 2/1989 | Hara et al. | 395/182.21 |
| 4,809,280 | 2/1989 | Shonaka | 395/185.08 |
| 4,876,517 | 10/1989 | Arcus | 330/277 |
| 4,879,647 | 11/1989 | Yazawa | 395/185.08 X |
| 4,903,193 | 2/1990 | Nakamura | 395/185.08 |
| 4,956,807 | 9/1990 | Hosaka et al. | 395/185.08 |
| 4,964,123 | 10/1990 | Umemoto | 395/182.21 |
| 5,109,506 | 4/1992 | Begun | 395/182.21 |
| 5,155,730 | 10/1992 | Maida | 395/182.21 |
| 5,283,792 | 2/1994 | Davies, Jr. | 395/182.2 |
| 5,398,332 | 3/1995 | Komoda et al. | 395/185.08 |
| 5,400,341 | 3/1995 | Makin et al. | 395/750 |
| 5,408,643 | 4/1995 | Katayose | 395/185.08 |
| 5,408,648 | 4/1995 | Gokan et al. | 395/182.21 |
| 5,495,314 | 2/1996 | Kikuchi | 395/185.08 X |
| 5,563,799 | 10/1996 | Brehmer | 395/185.08 X |

Primary Examiner—Robert W. Beausoliel, Jr.
Assistant Examiner—Glenn Snyder
Attorney, Agent, or Firm—Robert E. Bushnell, Esq.

[57] ABSTRACT

A circuit for resetting a system controller includes a level detector and a watch-dog circuit. The level detector compares a first reference voltage with a supply voltage provided to the system, and provides output of a first reset signal indicating that the controller is in an abnormal state in dependence upon the comparison between the first reference voltage and the supply voltage. The watch-dog circuit compares a second reference voltage with a voltage exhibited by the first reset signal, and provides output of a second reset signal to the controller to reset the controller in dependence upon the comparison between the second reference voltage and the voltage exhibited by the first reset signal. A connector provides the first reset signal from the level detector to the watch-dog circuit.

14 Claims, 2 Drawing Sheets

CPU RESET CIRCUIT

CROSS-REFERENCE TO RELATED APPLICATIONS

This application makes reference to, incorporates the same herein, and claims all benefits accruing under 35 U.S.C. §119 arising from an application for CPU Reset Circuit earlier filed in the Korean Industrial Property Office on 31 May 1995 and there duly assigned Serial No. 14069/1995.

BACKGROUND OF THE INVENTION

The present invention relates generally to a reset circuit for a central processing unit (hereinafter, "CPU"), and more particularly, to a circuit for resetting a CPU upon detecting an instable state for the purpose of stabilizing operation of a system employing the CPU.

Generally, a CPU reset circuit is comprised of a level detector and a watch-dog circuit. The level detector senses swings in the magnitude of a voltage supplied to the CPU. Also, in cases where a hardware or software error occurs, the watch-dog circuit restarts the CPU. Since a CPU is a required component in many devices, a CPU reset circuit is necessarily required in all devices using a CPU; particularly, those devices in which a high degree of reliability is required.

One prior art reference that discusses this subject is U.S. Pat. No. 5,408,648 entitled *Method And Apparatus For Diagnosing CPU For CPU-Runaway-Preventing Circuit* issued to Gokan et al. In Gokan et al. '648, when abnormal operation of the CPU or an abnormal reduction in voltage to the CPU is detected, the CPU is reset and reset signals for the CPU are counted. When the number of reset signals for a predetermined time satisfies specified conditions, a determination is made as to whether the CPU is in a failure state. While conventional art, such as Gokan et al. '648, possesses merit in its own right, I note that it fails to address the problem that occurs when a CPU is unable to be reset due to an inadequate duration of a reset signal.

SUMMARY OF THE INVENTION

Therefore, it is an object of the present invention to provide an improved CPU reset circuit.

It is another object to provide a circuit for resetting a CPU in response to a system malfunction or an abnormal state of a CPU.

It is still another object to provide a CPU reset circuit having a level detector and a watch-dog circuit, wherein an output from the level detector is provided as an input to the watch-dog circuit.

It is yet another object to provide a CPU reset circuit for overcoming a problem that occurs due to a level detector being unable to reset the CPU since a reset signal is generated for a time interval which is less than or equal to a time interval during which a swing in the magnitude of a supply voltage exists.

These and other objects can be achieved according to the principles of the present invention with a circuit for resetting a system controller. The circuit includes a level detector and a watch-dog circuit. The level detector compares a first reference voltage with a supply voltage provided to the system, and provides output of a first reset signal indicating that the controller is in an abnormal state in dependence upon the comparison between the first reference voltage and the supply voltage. The watch-dog circuit compares a second reference voltage with a voltage exhibited by the first reset signal, and provides output of a second reset signal to the controller to thereby reset the controller in dependence upon the comparison between the second reference voltage and the voltage exhibited by the first reset signal. A connector provides the first reset signal from the level detector to the watch-dog circuit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE INVENTION

Figure 1:
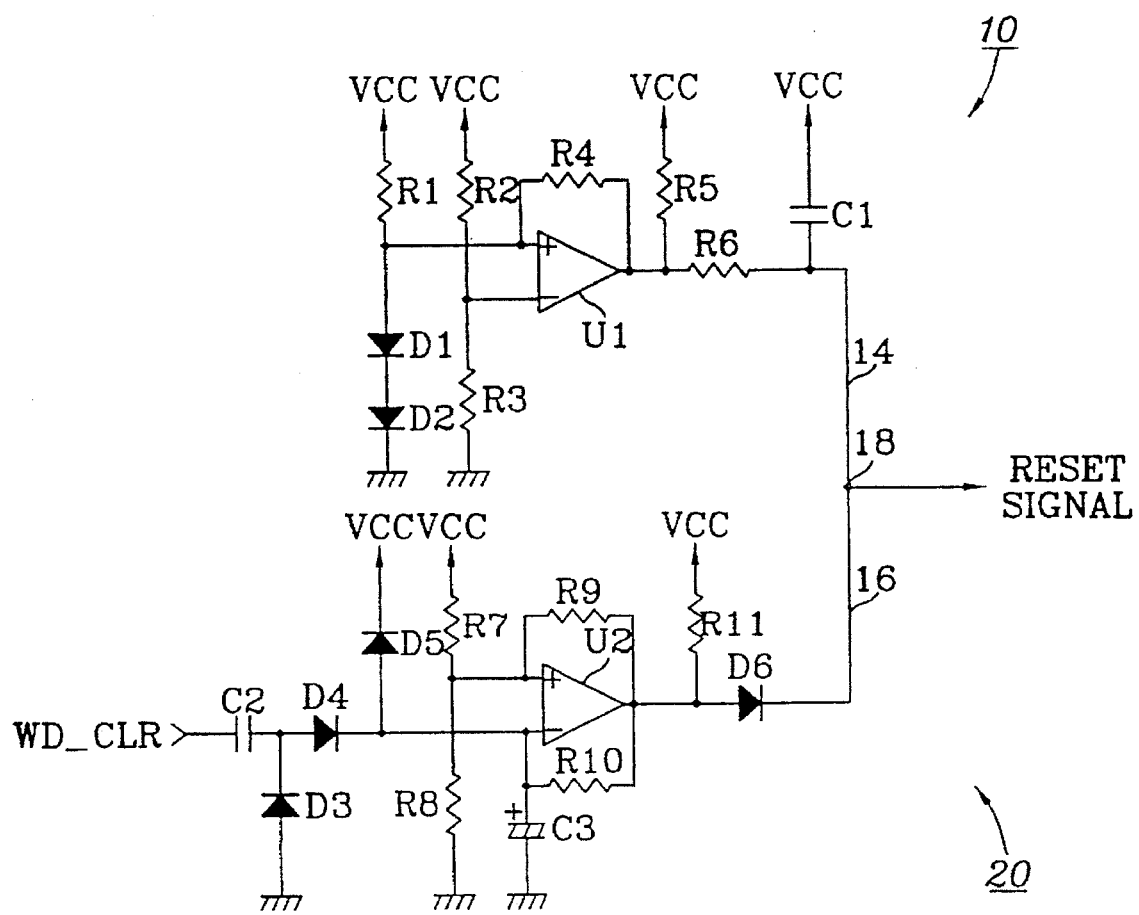
FIG. 1 is a circuit diagram of a general CPU reset circuit.

Turning now to the drawings and referring to FIG. 1, a circuit diagram of a general CPU reset circuit is shown. In FIG. 1, reference numeral 10 represents a level detector and reference numeral 20 represents a watch-dog circuit. Level detector 10 includes: an OP amp U1, resistors R1–R6, diodes D1 and D2, a capacitor C1 and an output line 14. Watch-dog circuit 20 includes: an OP amp U2, resistors R7–R11, diodes D3–D6, capacitors C2 and C3 and an output line 16. Output lines 14 and 16 are commonly connected to a node 18. Therefore, a reset signal output from either level detector 10 or watch-dog circuit 20 is applied to node 18, and is provided to a reset terminal of the CPU. That is, node 18 essentially performs a logical OR-operation on the outputs of level detector 10 and watch-dog circuit 20 to generate the reset signal.

The CPU reset circuit shown in FIG. 1 can be designed so that the reset signal exhibits either a logical 'high' state or a logical 'low' state. In the following description of FIG. 1, however, it is assumed that the reset signal exhibits the logical 'high' state.

Operation of level detector 10 will now be explained in detail. OP amp U1 compares a reference voltage received at a non-inverting input terminal (+) with a supply voltage VCC received at an inverting input terminal (−). When the magnitude of the supply voltage VCC is less than the magnitude of the reference voltage, output terminal 14 of level detector 10 provides a logical 'high' signal so that the reset signal in the logical 'high' state is output to reset the CPU. In FIG. 1, the fact that a swing in the magnitude of the supply voltage VCC is transmitted to output terminal 14 intact is an operational feature of level detector 10. Accordingly, a time interval during which the reset signal of the CPU is output due to a swing in the magnitude of the supply voltage VCC is less than or equal to a time interval during which the swing in the magnitude of the supply voltage VCC actually occurs.

Watch-dog circuit 20 of FIG. 1 is designed to operate as a pulse generator. Therefore, when a clear signal WD_CLR indicating that the CPU is in a normal operating state is periodically applied, watch-dog circuit 20 does not generate a pulse. When the CPU is in an abnormal state, however, and the clear signal WD_CLR is not applied, watch-dog circuit 20 generates a pulse based on a time constant of capacitor C3. In this instance, the logical 'high' state of the pulse serves as the reset signal for resetting the CPU, and the reset signal is continuously output until the CPU is reset.

In the CPU reset circuit of FIG. 1, the reset signal provided from watch-dog circuit 20 is usually generated for a proper time interval, and therefore presents little problem. The reset signal provided from level detector 10, however, is not always capable of resetting the CPU because the reset signal is generated for a time interval which is less than or equal to the time interval during which a swing in magnitude of the supply voltage VCC actually occurs.

Figure 2:
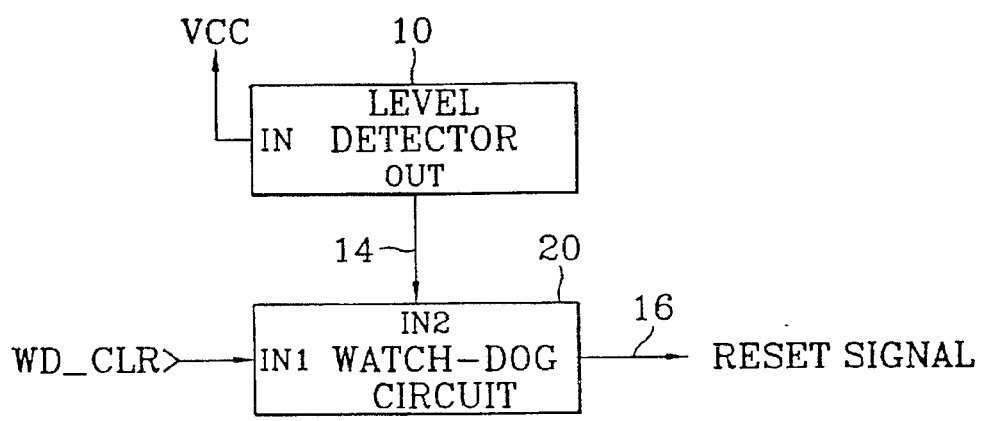
FIG. 2 is a block diagram of a CPU reset circuit constructed according to the principles of the present invention.

FIG. 2 is a block diagram of a CPU reset circuit constructed according to the principles of the present invention. The CPU reset circuit of FIG. 2, as the one shown in FIG. 1, includes both a level detector 10 and a watch-dog circuit 20. Since the reset signal provided from level detector 10 in FIG. 1 is not always generated for a time period that is long enough to reset the CPU, the reset signal provided from level detector 10 in FIG. 2 is not applied directly to the CPU, but rather to watch-dog circuit 20. Accordingly, the reset signal having an adequate duration is applied to the CPU from an output line 16 of watch-dog circuit 20.

Figure 3:
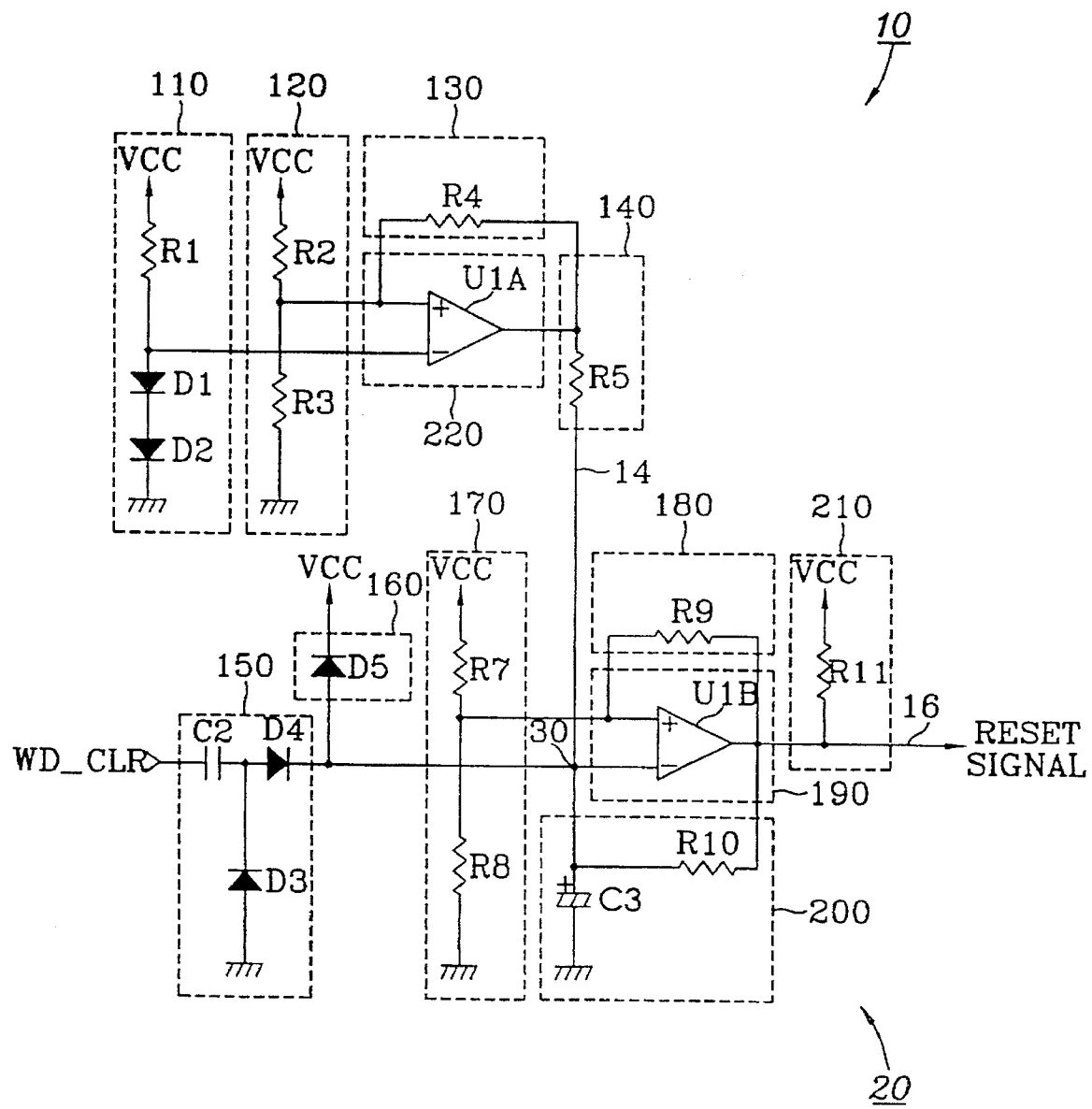
FIG. 3 is a circuit diagram of the CPU reset circuit constructed according to the principles of the present invention.

FIG. 3 is a circuit diagram of the CPU reset circuit constructed according to the principles of the present invention. In the CPU reset circuit of FIG. 3, it can be assumed that the reset signal applied to the CPU exhibits a logical 'high' state. In FIG. 3, an output line 14 of level detector 10 is connected to a node 30 of watch-dog circuit 20, and output line 16 of watch-dog circuit 20 is connected to a reset terminal of the CPU. Accordingly, the reset signal output from watch-dog circuit 20, as well as the reset signal output from level detector circuit 10, are provided through output line 16 of watch-dog circuit 20.

As depicted in FIG. 3, level detector 10 of the CPU reset circuit is comprised of a level detector (hereinafter, "LD") reference voltage unit 110, an LD power input unit 120, an LD hysteresis unit 130, an LD comparator 220 and an LD connector 140.

LD reference voltage unit 110 is constructed with a resistor R1 and diodes D1 and D2, and the forward bias voltages produced from diodes D1 and D2 are used as a reference voltage in LD comparator 220. In particular, the forward bias voltages are applied to an inverting input terminal (−) of an OP amp (i.e., operational amplifier) U1A of LD comparator 220.

LD power input unit 120 is composed of distributing resistors R2 and R3, and a distributed voltage provided by distributing resistors R2 and R3 is applied to a non-inverting input terminal (+) of OP amp U1A. The distributed voltage is used to represent the supply voltage VCC that is provided to operate the system controlled by the CPU. LD comparator 220 compares the magnitude of the distributed voltage applied to the non-inverting input terminal (+) with the magnitude of the reference voltage applied to the inverting input terminal (−). Accordingly, when the magnitude of the distributed voltage is less than the magnitude of the reference voltage, OP amp U1A provides an output in a logical 'low' state. LD hysteresis unit 130, which is coupled by a resistor R4 between the non-inverting input terminal (+) and an output terminal of LD comparator 220, feeds the output of LD comparator 220 back to the non-inverting input terminal (+), thereby adjusting the level of the distributed voltage applied to the non-inverting input terminal (+) in accordance with the output state of LD comparator 220. That is, since LD hysteresis unit 130 enables the distributed voltage to be generated at an upper threshold level and a lower threshold level, the output of LD comparator 220 exhibits a hysteresis effect. With respect to operation, when power is applied and the level of the distributed voltage is greater than the upper threshold level, the operation of resetting the CPU is released. Moreover, when the level of the distributed voltage is at least equal to the lower threshold level, the operation of resetting the CPU is capable of being performed.

In a first state, OP amp U1A of LD comparator 220 serves as an open collector, adequately receives electrical current, and outputs a logical 'low' signal (i.e., a ground level signal). Alternatively, in a second state, OP amp U1A is in a high impedance state. LD connector 140 is composed of a resistor R5 connected to the output terminal of LD comparator 220, and enables level detector 10 and watch-dog circuit 20 to be coupled to one another. A resistance value of connecting resistor R5 is preferably selected based on characteristics of a watch-dog circuit (hereinafter, "WD") charging/discharging unit 200.

According to the present invention, watch-dog circuit 20 of the CPU reset circuit is composed of a signal input unit 150 for providing input of a clear signal WD_CLR which is periodically applied by the CPU, a WD initializing unit 160, a WD reference voltage unit 170, a WD hysteresis unit 180, a WD comparator 190, WD charging/discharging unit 200 and a pull-up unit 210.

Regarding the operation of watch-dog circuit 20, when the supply voltage VCC is provided, reference voltage unit 170, WD comparator 190, WD hysteresis unit 180 and WD charging/discharging unit 200 operate as a pulse generator. The pulse period and duty cycle are determined by the positive component characteristics of WD charging/discharging unit 200 and WD reference voltage unit 170. Once the magnitude of a reference voltage applied to a non-inverting input terminal (+) of an OP amp U1B is greater than the magnitude of an input voltage applied to an inverting input terminal (−) of OP amp U1B, the output of WD comparator 190 shifts to a logical 'high' state. That is, when the clear signal WD_CLR is not applied, the output of WD comparator 190 is provided in the logical 'high' state. In this case, inasmuch as capacitor C3 of charging/discharging unit 200 is continuously in a charged state, the magnitude of the voltage applied to the inverting input terminal (−) of WD comparator 190 continues to increase. Therefore, when the magnitude of the voltage applied to the inverting input terminal (−) of WD comparator 190 is greater than the magnitude of the reference voltage applied to the non-inverting input terminal (+) of WD comparator 190, the output of WD comparator 190 shifts to a logical 'low' state so that capacitor C3 can be discharged, thereby enabling formation of a signal path through WD initializing unit 160. In such an event, WD charging/discharging unit 200 repeats charging and discharging operations in accordance with the output state of WD comparator 190. As a result, an electrical pulse is continuously generated on output line 16 of watch-dog circuit 20. In particular, the output is continuously applied to watch-dog circuit 20 until the clear signal WD_CLR is applied to watch-dog circuit 20 due to operation of the CPU.

Initializing unit 160 is constructed from a reverse bias diode D5, and forms a signal path as capacitor C3 is discharged. Initializing unit 160 provides the supply voltage VCC to the inverting input terminal (−) of WD comparator 190, thereby enabling comparison between the supply voltage VCC and the reference voltage applied to the non-inverting input terminal (+) of WD comparator 190. Since OP amp U1B serves as an open collector, pull-up unit 210 pulls up the supply voltage VCC to enable stable output of a logical 'high' signal.

The operation of level detector 10 in the present invention is different from the operation of level detector 10 in FIG. 1. In FIG. 1, level detector 10 indicates a reset state by providing output of a logical 'high' signal. With the present invention, however, level detector 10 is designed to indicate a reset state by providing output of a logical 'low' signal. That is, when a predetermined swing in the magnitude of the supply voltage VCC is sensed, a signal in the logical 'low' state is output through LD connector 140 to node 30. Since the application of a logical 'low' state to node 30 is the same as the state where the clear signal WD_CLR is not applied, the pulse can be continuously generated from the output line of WD comparator 190. In other words, applying a logical 'low' signal to node 30 enables the pulse to be generated by discharging the stored electrical potential of capacitor C3 of watch-dog circuit 20. Since the duty cycle of the pulse generated from the above operation serves as the duty cycle of the pulse from watch-dog circuit 20, the CPU can be adequately reset.

While the general CPU reset circuit can generate a reset signal in either a logical 'high' state or a logical 'low' state, the CPU reset circuit according to the present invention has been embodied to generate the reset signal for the CPU in only the logical 'high' state. It will be apparent to those skilled in the art, however, that the CPU reset circuit for resetting the CPU with a logical 'low' signal may be practiced without providing any specific details.

As is apparent from the foregoing, the present invention provides an advantage in that voltage swings, external/internal noise and hardware and software errors can be prevented since the output of level detector 10 is connected to the input of watch-dog circuit 20.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A circuit for resetting a controller that controls a system, said circuit comprising:

level detecting means for comparing a first reference voltage with a supply voltage provided to said system, and providing output of a first reset signal indicating that said controller is in an abnormal state in dependence upon the comparison between said first reference voltage and said supply voltage;

watch-dog means for comparing a second reference voltage with a voltage exhibited by said first reset signal, and providing output of a second reset signal to said controller to reset said controller in dependence upon the comparison between said second reference voltage and said voltage exhibited by said first reset signal; and connecting means for providing said first reset signal from said level detecting means to said watch-dog means.

2. The circuit as claimed in claim 1, wherein said level detecting means comprises an operational amplifier.

3. The circuit as claimed in claim 1, wherein said watch-dog means comprises an operational amplifier.

4. A circuit for resetting a central processing unit, said circuit comprising:

first means for comparing a first reference voltage with a supply voltage provided to a system controlled by said central processing unit, and providing output of a first reset signal indicating that said central processing unit is in an abnormal state in dependence upon the comparison between said first reference voltage and said supply voltage;

second means for comparing a second reference voltage with a voltage exhibited by said first reset signal, and providing output of a second reset signal to said central processing unit to reset said central processing unit in dependence upon the comparison between said second reference voltage and said voltage exhibited by said first reset signal;

third means for performing charging and discharging operations in dependence upon said first reset signal and said second reset signal; and connecting means for providing said first reset signal from said first means to said second means and said third means, and for providing said second reset signal from said second means to said third means.

5. The circuit as claimed in claim 4, wherein said first means comprises an operational amplifier.

6. The circuit as claimed in claim 4, wherein said second means comprises an operational amplifier.

7. A method for resetting a central processing unit, comprising the steps of:

comparing a first reference voltage with a supply voltage provided to a system controlled by said central processing unit;

providing output of a first reset signal indicating that said controller is in an abnormal state in dependence upon the comparison between said first reference voltage and said supply voltage;

comparing a second reference voltage with a voltage exhibited by said first reset signal; and providing output of a second reset signal to said central processing unit to reset said central processing unit in dependence upon the comparison between said second reference voltage and said voltage exhibited by said first reset signal.

8. A circuit for resetting a central processing unit, said circuit comprising:

a first reference voltage unit for generating a first reference voltage;

a power input unit for generating a distributed voltage;

a first comparator having a first input terminal for receiving said distributed voltage and a second input terminal for receiving said first reference voltage, said first comparator comparing said distributed voltage with said first reference voltage and providing output of a first reset signal in dependence upon the comparison between said distributed voltage and said first reference voltage;

a second reference voltage unit for generating a second reference voltage; and a second comparator having a first input terminal for receiving said second reference voltage and a second input terminal for receiving said first reset signal, said second comparator comparing said second reference voltage with a voltage exhibited by said first reset signal and providing output of a second reset signal to said central processing unit to reset said central processing unit in dependence upon the comparison between said voltage exhibited by said first reset signal and said second reference voltage.

9. The circuit as claimed in claim 8, further comprising hysteresis means connected between said first input terminal of said first comparator and an output terminal of said first comparator for providing a hysteresis effect.

10. The circuit as claimed in claim 9, wherein said hysteresis means comprises a resistor.

11. The circuit as claimed in claim 10, wherein said first input terminal of said first comparator comprises a non-inverting terminal, and said second input terminal of said first comparator comprises an inverting terminal.

12. The circuit as claimed in claim 8, further comprising hysteresis means connected between said first input terminal of said second comparator and an output terminal of said second comparator for providing a hysteresis effect.

13. The circuit as claimed in claim 12, wherein said hysteresis means comprises a resistor.

14. The circuit as claimed in claim 13, wherein said first input terminal of said second comparator comprises a non-inverting terminal, and said second input terminal of said second comparator comprises an inverting terminal.

* * * * *